United States Patent [19]
Caroselli

[11] 3,861,112
[45] Jan. 21, 1975

[54] PANEL ASSEMBLING AND FASTENING DEVICE

[75] Inventor: Danilo Caroselli, Milan, Italy

[73] Assignee: Tapira Establishment, Triesen, Liechtenstein

[22] Filed: Mar. 20, 1974

[21] Appl. No.: 453,157

[30] Foreign Application Priority Data
Mar. 22, 1973 Italy .................................. 21942/73

[52] U.S. Cl. ................ 52/758 D, 24/81 E, 52/285, 52/584, 220/65
[51] Int. Cl. ............................................. F16b 5/06
[58] Field of Search ........... 403/169, 170, 171, 172, 403/173, 176, 178, 190, 191, 256, 257, 217, 263, 290, 344; 52/280, 285, 284, 584, 758 D, 753 D, 753 C, 754; 24/81 E, 81 CR, 260; 217/13, 45, 65

[56] References Cited
UNITED STATES PATENTS

| | | | |
|---|---|---|---|
| 1,706,388 | 3/1929 | Ashkenas | 52/753 D X |
| 2,683,329 | 7/1954 | Kobler | 403/174 X |
| 3,092,360 | 6/1963 | Cook et al. | 248/56 |
| 3,507,526 | 4/1970 | Packman et al. | 403/173 |
| 3,542,407 | 11/1970 | Brown | 403/173 X |
| 3,695,649 | 10/1972 | Lavergne | 403/173 X |
| 3,765,541 | 10/1973 | Madey et al. | 403/171 X |

*Primary Examiner*—Jordan Franklin
*Assistant Examiner*—Wayne L. Shedd
*Attorney, Agent, or Firm*—Cushman, Darby & Cushman

[57] ABSTRACT

A device for fastening and assembling elongate bodies such as slabs and tubes in a removable manner is disclosed, said device comprising a block made of a comparatively resilient body having slots for receiving the edges of the slabs or tubes to be connected, perforations parallel to the slots and having radial extension slots, a counterblock having projections capable of engaging the perforations of the block to expand them, said counterblock having a screw-thread adapted to be engaged by a screw-threaded shaft attached to a handwheel, the shaft being passed through the block aforesaid, so that the tightening of the screw clamps the plate, the counterblock, the block and the members to be interconnected which have been inserted in the slots.

7 Claims, 7 Drawing Figures

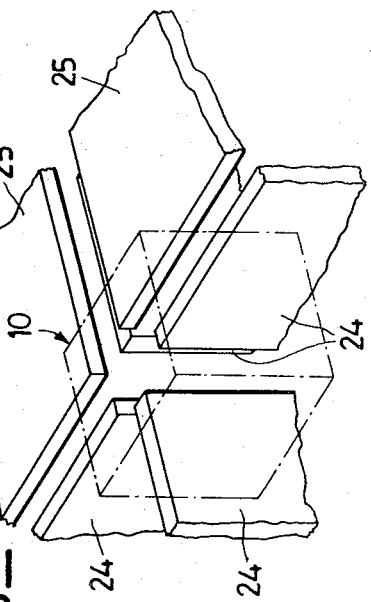
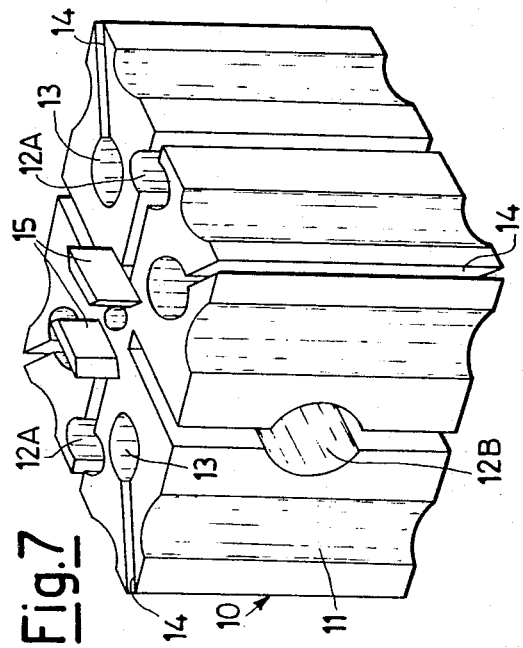
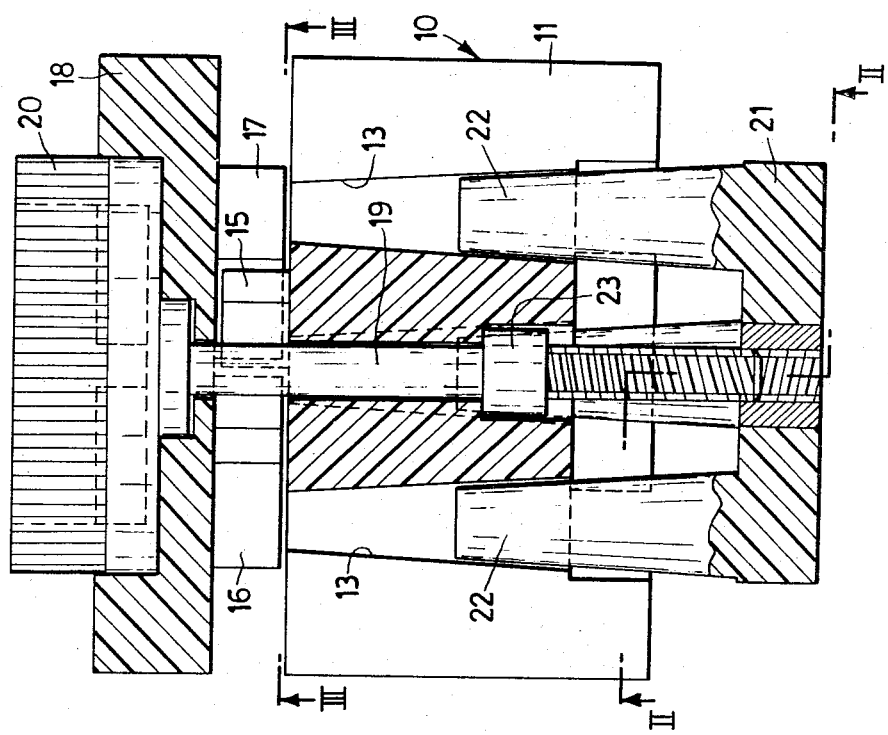

PANEL ASSEMBLING AND FASTENING DEVICE

This invention relates to a device for fastening together panels, tubes and the like and more particularly to a device which is adapted to provide a dismemberable union and which can be easily and conveniently manipulated.

It is known to make up lightweight structures, for example of the kind for displaying goods, by using glass slabs, or slabs of wood, plastics, metal which are united together, especially along their respective edges.

These structures afford the advantage of being capable of being assembled in different manners, a wide variety of shapes being thus obtainable.

It has been suggested to unite the slabs or panels by clamps, tongues or angle irons which connect the slabs pairwise and impose a cumbersome assemblage operation with the use of tools.

Resiliently actuated clamps have proven to be extremely unpractical since they do not afford a reliable connection; in addition their mounting by pressural force on crystal slabs is likely to cause breakage of the glass.

The object of the present invention is to provide a device capable of grasping the edges of a plurality of elements having at least a dimension which is much larger than the other dimensions, such as slabs, tubes, and the like with an adjustable pressure so as to unite them to form any desired structure.

A further object is that of providing such a device that it could be stably united to the slabs with a simple and quick manipulation or disengaged from the slabs.

The foregoing and other objects are achieved according to the invention by providing a device capable of grasping the edges of a plurality of elements as hereinbefore defined and is characterized in that it comprises a body in which a plurality of housings is formed, which are adapted to receive, each, the terminal portion of an element, in the vicinity of said housing there being formed through the body seatings which taper and have a radial cut in correspondence with a geometrical generating line, an element carrying pins which are tapered and are slidably housed in said seatings, said element being connected to the body by means of a screwed connection having the axis parallel to the axis of said seatings.

The features and advantages of the present invention will become clearer from the ensuing description of an example as shown in the accompanying drawings, wherein:

FIG. 1 shows a device according to the invention in a longitudinal cross-sectional view taken along the line I—I of FIG. 2.

FIG. 4 is a diagrammatical view of the device in a structure as composed by interconnected slabs.

FIG. 7 is a perspective view of an alternative embodiment of the device according to the invention.

Figure 3:
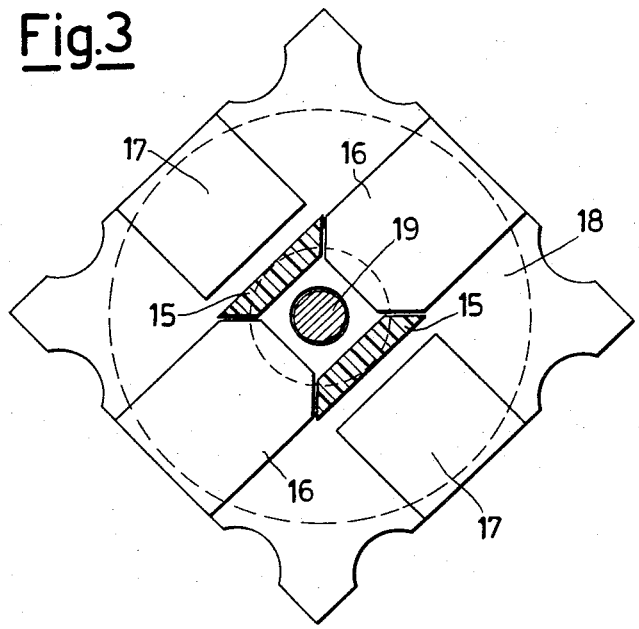
FIG. 3 is a cross-sectional view taken along the line III—III of FIG. 1.
Figure 2:
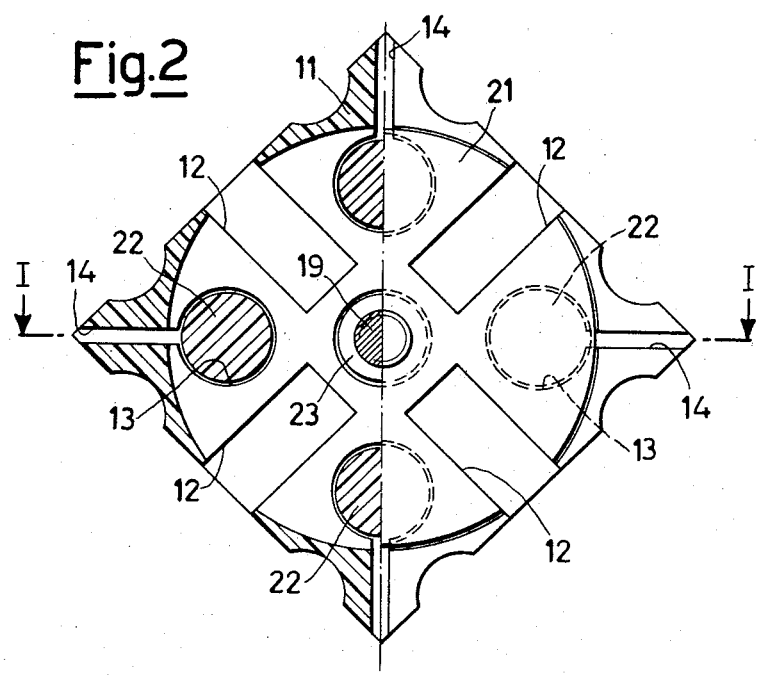
FIG. 2 shows a view, partly in cross-section taken along the line II—II of FIG. 1.

As shown in FIGS. from 1 to 3, the device as generally indicated at 10 comprises a body 11 in which slots 12 have been formed. Between the slots, and parallely thereto conical seats 13 are formed, which have, each, a radial cut 14 arranged along a generating line of the seat.

From one of the surfaces of the body 11 project tabs 15, which slidably engage projections 16 and 17 of a plate 18.

Through both the plate 18 and the body 11 a screw-threaded rod 19 is passed, having a knob 20 and screwably engaging an element 21 from which conical pins 22 protrude: these latter are housed in a slidable manner in the seatings 13. The rod 19 is freely rotatable within the body 11 but its axial sliding motion is limited by an abutment 23 which is integral with the rod 19.

The element 21 has substantially the same cross-sectional shape as the body 11, more particularly the slots 12 are extended thereinto.

It is now apparent that if the knob 20 is rotated to as to screw the rod 19 into the element 21, the plate 18 is pressed with its projections 15 and 17 against the body 11 and also the element 21 is recalled against the body 11. This movement causes the pins 22 to enter the seats 13 and these are widened due to the resiliency imparted by the cuts 14, while the width of the slots 12 is concurrently reduced.

Thus by unscrewing the rod 19 from the element 21 the shoulder 23 rests against the body 11 and the element 21 has been set aside by withdrawing the pins 22 from the seats 13 and restoring the device 10 to its position of FIG. 1.

In order that the above indicated deformations of the body 11 may be allowed, the body will be made of an appropriate material, such as one endowed with the required resiliency; the use of certain appropriate plastics materials has proven to be advantageous and these, moreover, permits to obtain the body 11 of the device, as well as the element 21 and the plate 18, with any of the conventional shaping methods, in a convenient and cheap manner.

Figure 5:
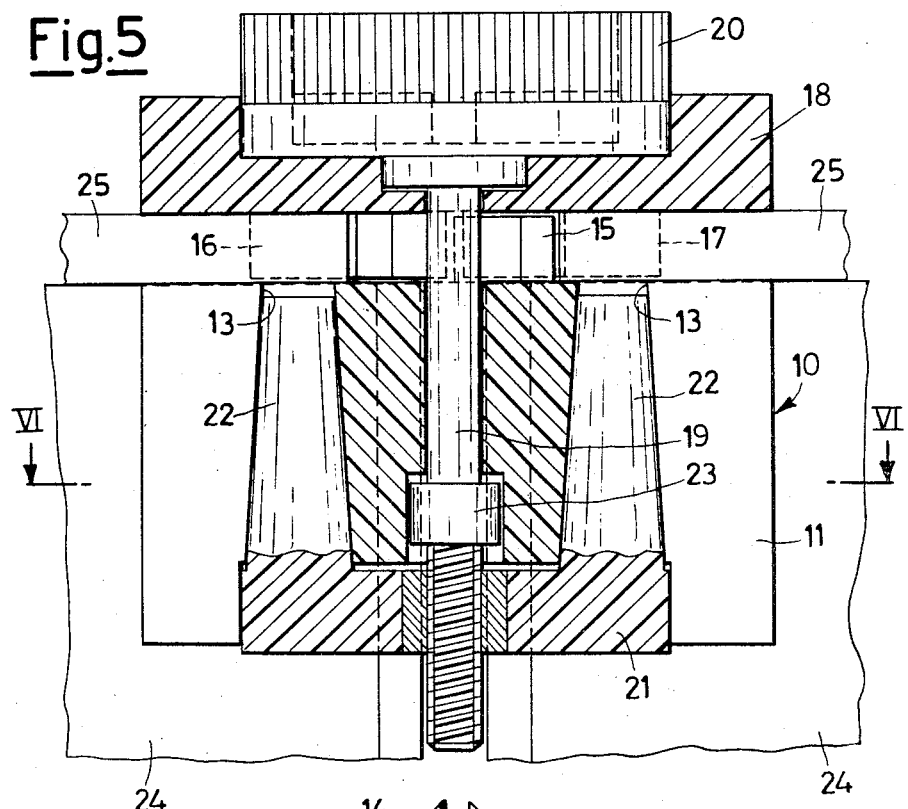
FIG. 5 shows a view similar to that of FIG. 1 for a different working position of the device.
Figure 6:
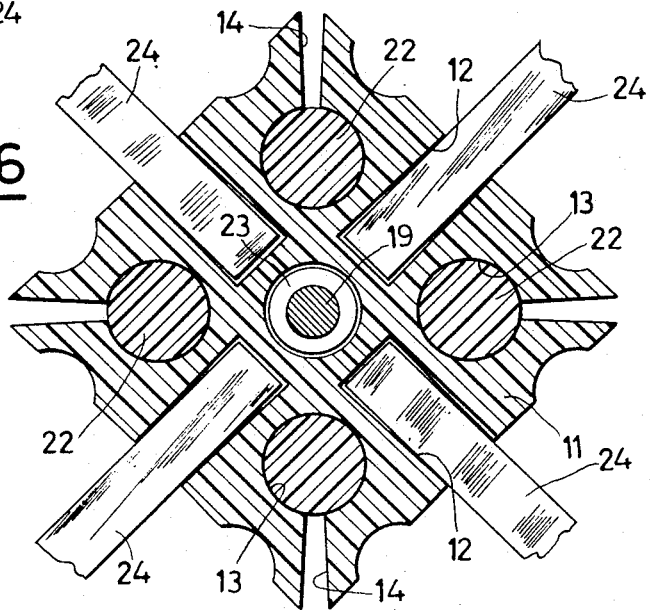
FIG. 6 is a cross-sectional view taken along the line VI—VI of FIG. 5.

The practical application of the device is further elucidated with the aid of the FIGS. 4, 5 and 6.

In FIG. 4 there are shown in partial view slabs, in the positions where they can be interconnected by the device 10. There are shown by way of example four vertical slabs 24 and two horizontal slabs 25.

The device 10 can be arranged with the edges of the slabs 24 inside the losts 12: the edges of the slabs 25 are housed between the plate 18 and the body 11, in the areas comprised between the projections 16 and 17.

It is apparent that by screwing the rod 19 by means of the knob 20, the edges of the slabs 24 are firmly grasped by the slots 12 which are pushed to become closed by the action of the pins 22 in the seats 13. In addition, the plate 18, against which the knob 20 is active, presses the edges of the slabs 25 against the body 11, by grasping them. Such a situation is shown in FIGS. 5 and 6.

If there are no slabs 26 during screwing, the projections 16 and 17 merely abut the body 11 and the device works in a manner which is quite similar to the one described above.

The rotation of the knob can be continued until the clamping force imparted to the slabs 24 and 25 is deemed sufficient.

The mere unscrewing of the rod 19 frees all the slabs from the engagement with the device.

There has been shown by way of example a clamping device which is capable of clamping four slabs perpendicular to each other and thus involving four slots angularly spaced apart through 90 degrees. Such a device is capable of grasping thus, at the most, four perpendicular slabs and four coplanar slabs which, in turn, are perpendicular to the former slabs.

Obviously, such a device as illustrated is capable of connecting only a few of the slabs which can be housed therein. With reference to FIG. 4 it can connect, for example, four slabs 24 with two horizontal slabs 25. It can connect four slabs 24 with four slabs 25, or any lower number of slabs arranged in the same way.

The device could comprise to this end a greater or lesser number of slots 12 and a corresponding number of pins 22 expanded therebetween and acting on the body 11.

For example, the slots 12 can be two only, and thus be adapted to receive the edges of two slabs.

The same configuration the individual component parts can be varied with respect to what has been shown: for example the seats 13 and correspondingly the pins 22, can have a shape other than the conical shape with circular cross-section, and have anyhow a wedgelike form so that the penetration of the pins in the seats involve a widening of the latter and a shrinking of the slots 12.

The knob 20, moreover, can have matching surfaces for a tool which permits, if required, to impart thereto a force greater than that which could be imparted to it merely by hand.

In the foregoing description there has been made an explicit reference to the union of slabs and panels and, for this reason, the housings are embodied by the slots 12, longitudinally oriented with respect to the body and parallel to the axis thereof. In the case of tubes or rolled sections, conversely, such housings could be embodied by slots such as 12 but having a different cross-sectional shape, both in the form of a substantially cylindrical hollow or a shape corresponding to that of the orthogonal axis section or inclined with respect to that of the body and thus of the union and actuating screw. In the latter case the cavities will be the seatings for the tubes to be connected. Both these embodiments have been shown by way of example of FIG. 7 where the numeral 12A shows seatings adapted to receive and lock tubes or rolled sections, while the numeral 12B shows housings for the ends of tubular elements to be united.

It is understood that the body 10 can have housings such as 12A only, or such as 12B only.

What is claimed is:

1. A device for grasping the edges of a plurality of elements having at least one dimension which is much greater than the others, such as slabs, tubes and the like in order to interconnect them, characterized by comprising a body in which there are formed a plurality of housings adapted to receive, each, a terminal portion of an element in the vicinity of said housings there being formed in the body tapered seats having a radial cut substantially in correspondence with a geometric generating line, an element carrying pins which are correspondingly tapered and are slidably housed in said seatings, said latter element being connected to said body by means of a screw connection whose axis is parallel to the axis of said seatings.

2. A device according to claim 1, characterized in that said housings are formed in the shape of slots which are longitudinally oriented with respect to said body and parallel to its axis.

3. A device according to claim 1, characterized in that said housings are formed in the shape of cavities whose axis is not parallel to the longitudinal axis of the body.

4. A device according to claim 1, characterized in that said screw connection is formed by a rod which is mounted for rotation and slidably locked within said body and protrudes therefrom with a screw-threaded end which is screwed in said element.

5. A device according to claim 4, characterized in that said rod urges a plate which is slidably guided on said body and is confrontingly mounted with respect to a surface of the body which is perpendicular to said slots, the edges of slabs perpendicular to the slabs received by said slots capable of being housed between the plate and the body surface.

6. A device according to claim 4, characterized in that said rod projects from said body in the form of a handle in correspondence with the end away of the screw-threaded end.

7. A device according to claim 1, characterized in that in the body there are formed four slots perpendicular to each other and four seatings are peripherally distributed therebetween, whose radial cut is open towards the outside.

* * * * *